Feb. 11, 1941. H. A. ANDERSEN 2,231,609
ZERO SHIFTER CRANK
Filed June 28, 1939
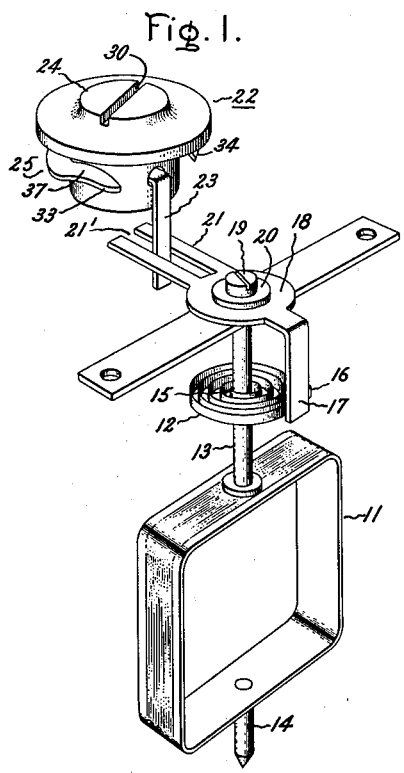
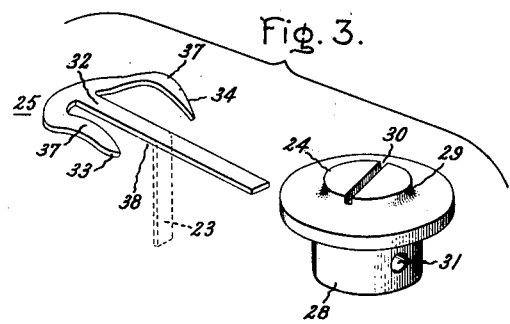
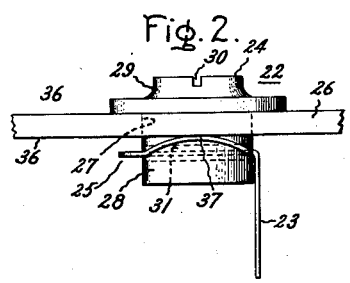
Inventor:
Henry A. Andersen,
by Harry E. Dunham
His Attorney.

Patented Feb. 11, 1941

2,231,609

UNITED STATES PATENT OFFICE 2,231,609

ZERO SHIFTER CRANK

Henry A. Andersen, Swampscott, Mass., assignor to General Electric Company, a corporation of New York Application June 28, 1939, Serial No. 281,541

2 Claims. (Cl. 171—95)

My invention relates to rotatable mountings and concerns particularly rotatably mounted cranks for effecting adjustments of the internal mechanism of instruments enclosed in casings.

It is an object of my invention to provide an improved, simplified, inexpensive, easily constructed and assembled zero shifter crank for use in deflecting instruments, such as electrical measuring instruments. Other and further objects and advantages will become apparent as the description proceeds.

In carrying out my invention in its preferred form the instrument in which my zero shifter crank is to be used is provided with a cover generally made of glass having a small circular opening therein near the position of the fork customarily forming a part of the biasing spring regulator of deflecting measuring instruments. The zero shifter crank is so arranged that it is rotatably mounted in the opening in the cover, and has a crank pin engaging the fork in the spring regulator.

The invention will be understood more readily from the following detailed description when considered in connection with the accompanying drawing and those features of the invention which are believed to be novel and patentable will be pointed out in the claims appended hereto. In the drawing Figure 1 is a perspective view showing the main elements of a deflecting electrical instrument involved in one embodiment of my invention, except that the cover glass is omitted for the sake of clarity. Figure 2 is a side elevation of the zero shifter crank shown in Figure 1, together with a fragmentary view of the cover glass in which the crank is mounted, and Figure 3 is an exploded perspective view of the zero shifter crank of Figure 2 showing the parts before assembly and illustrating the manner of assembly. Like reference characters are utilized throughout the drawing to designate like parts.

As is well known to those skilled in the art, it is customary to provide arrangements for setting the zero of electrical instruments and other spring biased deflecting instruments by adjusting the angular position of the fixed support of the spiral biasing spring employed for restoring the movable element of the instrument to zero position and providing it with the requisite opposition to up-scale movement to obtain the calibration. In the arrangement of Figure 1 there is shown a movable element represented as a rotatable coil 11 of an electrical instrument with the bearings, deflecting pointer and most of the stationary portion of the instrument omitted for the sake of clarity. A single biasing spring 12 surrounding the upwardly extending movable-element-supporting shaft 13 is shown, although it will be understood that frequently a second biasing spring is also employed which may surround the downwardly extending shaft 14. However, it is usual to provide only one of the biasing springs with a support, so arranged that adjustment may be made after the instrument element is enclosed in a case and accordingly only the one biasing spring 12 is shown. The inner end 15 of the biasing spring 12 is secured to the shaft 13 and the outer end 16 is secured to the downwardly extending arm 17 of an angularly adjustable spring regulator 18 in order to provide an adjustable fixed support for the outer end 16 of the biasing spring 12. Suitable means, such as a screw 19 and a spring washer 20, are provided for mounting the regulator 18 in such a manner that it will be angularly adjustable, but will frictionally maintain any angular position to which it is adjusted. The spring regulator 18 includes also a radially extending fork or slotted member 21 adapted to be engaged by a suitable crank pin for rotating the spring regulator 18 and effecting adjustment thereof. The features thus far explained in detail do not, in themselves, constitute my invention.

For the purpose of engaging the slot 21' in the spring regulator 18 I provide a zero shifter crank 22 having a crank pin 23 extending into the slot 21' transverse to the plane of the fork 21. The zero shifter crank 22 comprises a knob 24 and a spring clip 25. The knob 24 may be composed of any desired suitable material, such as a moulded composition like hard rubber or a phenolic condensation product which may be readily produced at little cost in any desired shape, and the spring clip 25 may consist of any suitable material, such as spring steel or spring brass. The zero shifter crank 22 is rotatably mounted upon a cover glass 26 (shown fragmentarily in Figure 2) of the instrument in which the crank is used.

The cover glass 26 has a circular aperture 27 therein suitably positioned to bring the crank pin 23 into registry with the spring regulator slot 21', and the knob 24 has a shank 28 of such diameter as to fit easily into the opening 27 in the glass 26. At one end of the knob 24 there is provided a flanged head 29 which may, if desired, have suitable means, such as an eye 30, adapted to receive the blade of a screwdriver or similar tool for rotating the knob 24. The shank 28 has a hole 31 drilled through it traversely to receive the spring clip 25.

The spring clip 25, which may be stamped out of sheet metal includes a tab 32 which, in the specific arrangement shown, is a center tab for securing the spring clip 25 in the shank 28 of the knob 24. The spring clip 25 may include arms or tabs 33 and 34 serving as stops to prevent the knob 24 from dropping out of the opening 27 in the cover glass 26. In the specific arrangement shown the arms 33 and 34 are outer arms or tabs extending on either side of the shank 28. For purpose of maintaining the head 28 of the knob 24 closely against the outside surface of the glass 26 and for the purpose of frictionally maintaining the knob 24 in the angular position to which it may be turned, the outer tabs 33 and 34 are so shaped that they bear resiliently against the inner surface 36 of the glass 26. For example, the middle portions 37 of the outer tabs 33 and 34 may be bowed upwardly thereby forming rounded contact surfaces engaging the lower surface 36 of the glass 26.

The center tab 32 is preferably of greater length than the outer tabs 33 and 34 as it has the dual purpose of securing the spring clip 25 to the shank 28 of the knob 24 and of forming the crank pin 23. The manner of assembly of the apparatus will be apparent from Figure 3. It will be understood that after assembly of the instrument mechanism and spring regulator 18, and before placing the cover of the instrument in which the apparatus is used on the instrument casing, the knob 24 is inserted in the aperture 27 in the cover glass 26. The spring clip 25 is then slipped in place with the center tab 32 passing through the hole 31 in the shank 28 whereupon the end of the center tab 32 beyond the point 38 is bent down perpendicularly, as represented by the dotted lines of Figure 3, whereby the end of the center tab 32 forms the crank pin 23 of the completed zero shifter crank. It will be understood, of course, that in placing the cover of the instrument on the casing, the zero shifter crank will be turned to such a position that the crank pin 23 registers with the slot 21. This operation is very easy, inasmuch as the cover glass 26 is transparent. Since the zero shifter crank consists of only two parts and may be mounted in the cover glass so that it requires no separate mounting or bearing arrangements, it lends itself to use in instruments where the cost of production must be maintained at a minimum.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. A zero shifter crank for a measuring instrument having a zero regulator and having a cover adapted to have an opening therein, said crank comprising a knob with a shank adapted to pass through the opening in the instrument cover, and a spring clip passing transversely through said shank and having a protruding end bent at an angle to form a crank pin adapted to manipulating the zero regulator of the instrument and serving to lock the crank assembly to the instrument cover.

2. In a measuring instrument having a zero regulator, a cover glass for an instrument having an opening therein, and a zero shifter crank rotatably secured in said opening, said crank comprising a knob with a shank passing through the said opening, and a spring clip passing transversely through said shank having a protruding end bent at an angle to form a crank pin adapted to manipulating the zero regulator and serving to lock the crank assembly to the cover glass, said clip having arms on either side of said shank bowed to press resiliently against said glass for frictionally maintaining said crank in a given angular position.

HENRY A. ANDERSEN.